US006961017B1

(12) United States Patent
Naylor et al.

(10) Patent No.: US 6,961,017 B1
(45) Date of Patent: Nov. 1, 2005

(54) APPARATUS FOR PROVIDING ANTI-JAMMING CAPABILITY TO LEGACY GPS RECEIVERS

(75) Inventors: James E. Naylor, Endicott, NY (US); Scott O. Sorber, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/012,371

(22) Filed: Dec. 15, 2004

Related U.S. Application Data

(60) Provisional application No. 60/529,857, filed on Dec. 16, 2003.

(51) Int. Cl.[7] ............................................. H04B 7/185
(52) U.S. Cl. .................................. 342/357.02; 342/16
(58) Field of Search ............................ 342/16, 357.01, 342/357.02, 357.06, 357.12; 701/207, 213, 701/215

(56) References Cited

U.S. PATENT DOCUMENTS

| | | | |
|---|---|---|---|
| 4,673,943 A | 6/1987 | Hannan | |
| 5,268,927 A * | 12/1993 | Dimos et al. ................ | 375/147 |
| 5,317,322 A | 5/1994 | Grobert | |
| 5,625,363 A | 4/1997 | Spilker | |
| 5,694,416 A | 12/1997 | Johnson | |
| 5,712,641 A | 1/1998 | Casabona et al. | |
| 5,872,540 A | 2/1999 | Casabona et al. | |
| 5,917,446 A | 6/1999 | Greenspan | |
| 5,952,968 A | 9/1999 | McDowell | |
| 5,955,987 A | 9/1999 | Murphy et al. | |
| 6,031,485 A | 2/2000 | Cellai | |
| 6,031,487 A | 2/2000 | Mickelson | |
| 6,084,540 A | 7/2000 | Yu | |
| 6,141,371 A | 10/2000 | Holmes et al. | |
| 6,219,373 B1 | 4/2001 | Lee et al. | |
| 6,392,596 B1 | 5/2002 | Lin et al. | |
| 6,473,034 B2 | 10/2002 | Lin et al. | |
| 6,861,983 B2 * | 3/2005 | Casabona et al. ........... | 342/420 |
| 6,882,310 B1 * | 4/2005 | Drentea ................. | 342/357.12 |
| 2002/0053989 A1 | 5/2002 | Lin et al. | |
| 2002/0122002 A1 | 9/2002 | Maalouf et al. | |
| 2002/0169578 A1 | 11/2002 | Yang | |
| 2002/0171580 A1 | 11/2002 | Gaus, Jr. et al. | |

OTHER PUBLICATIONS

Kim, S. and Iltis, R., *GPS C/A Code Tracking with Adaptive Beamforming and Jammer Mulling*; Dept. of Electrical and Computer Engineering, University of California; pp. 1-5 (no date).

Brown, A. and Gerein N., *Test Results of a Digital Beamforming GPS Receiver in a Jamming Environment*; Proceedings of ION GPS 2001, Salt Lake City, Utah, Sep. 2001; pp. 1-10.

(Continued)

*Primary Examiner*—Dao Phan
(74) *Attorney, Agent, or Firm*—Leland D. Schultz; Antony P. Ng; Dillon & Yudell LLP

(57) ABSTRACT

Most GPS equipped platforms currently in use have no anti-jamming capability. However, for various reasons, the cost of replacing the legacy GPS receivers with newer GPS receivers capable of anti-jamming is often prohibitive. Thus, an apparatus having antenna electronics that can perform the anti-jammming function is used to regenerate clean RF signals (with interference removed) to a legacy GPS receiver. With the apparatus, the legacy GPS receiver regards the RF signals as the usual interference-free RF signals.

6 Claims, 5 Drawing Sheets

OTHER PUBLICATIONS

Brown, A.; *Performance and Jamming Test Results of a Digital Beamforming GPS Receiver*; Joint Services Data Exchange, May 2002; pp. 1-11.

Persaud et al.; *Anti-Jamming Receiver Designs and Techniques*; Iowa State University; Wireless System Security—537, S03; Apr. 28, 2003; pp. 1-17.

Nicolaides et al.; *Digital Beam/Null Forming Adaptive Antenna for GPS Anti-Jam Application*; paper presented at the 23rd Joint Services Data Exchange Meeting, Orlando, FL, Nov. 18-21, 1996; pp. 1-11 (www.mayflowercom.com—Jun. 30, 2003).

* cited by examiner

APPARATUS FOR PROVIDING ANTI-JAMMING CAPABILITY TO LEGACY GPS RECEIVERS

RELATED PATENT APPLICATION

The present patent application claims priority to copending provisional application U.S. Ser. No. 60/529,857, filed on Dec. 16, 2003.

BACKGROUND OF THE INVENTION

1. Technical Field

The present invention relates to the Global Positioning System (GPS) in general, and in particular to GPS receivers. Still more particularly, the present invention relates to an apparatus for providing anti-jamming capability to legacy GPS receivers.

2. Description of Related Art

The Global Positioning System (GPS) was originally designed and developed to serve military needs. However, over the years, GPS applications have been extended from the military arena to the commercial arena. GPS applications in the commercial arena include automobile navigation, automatic vehicle location, land surveying, aircraft navigation and landing systems, precise timing systems, etc.

GPS radio navigation relies upon a constellation of twenty-four active (plus active spare) GPS satellites travelling in six different orbital planes around the earth. GPS position fixes are obtained by measuring the propagation delay times of radio signals broadcasted by the orbiting GPS satellites. Typically, a user must receive GPS radio signals from at least four satellites in order to solve for three position variables as well as a timing error that are needed to precisely determine a location and time.

Generally speaking, GPS radio signals are approximately 30 dB below the thermal noise floor. In other words, the level of GPS radio signals received on earth is only $\frac{1}{1000}^{th}$ as strong as the noise environment around a GPS receiver attempting to track the GPS radio signals. The challenge of tracking GPS radio signals is further compounded by the presence of interference or jamming. Sophisticated techniques have been developed to combat jamming, but the implementations of those techniques are not always practical for legacy GPS receivers.

For example, current digital anti-jamming systems, which provide GPS anti-jamming protection by simultaneously pointing beams at GPS satellites of interest and nulling interference sources, are typically implemented with a digital GPS receiver and an anti-jamming electronic unit. However, many legacy aircraft navigation systems are not able to take advantage of the above-mentioned beam-steering technique without their analog GPS receiver being replaced. The replacement of a GPS receiver typically requires software to be updated and aircraft wiring to be replaced. In addition, the new navigation system must be re-qualified or re-certified. Thus, there is a significant expense involved in applying state-of-the-art anti-jamming technology to a legacy aircraft navigation system.

Consequently, it would be desirable to provide an improved apparatus for equipping legacy aircraft navigation systems with state-of-the-art anti-jamming capability.

SUMMARY OF THE INVENTION

In accordance with a preferred embodiment of the present invention, an apparatus for providing anti-jamming capability to a legacy GPS receiver includes a radio frequency (RF) converter, an anti-jamming processing component, a signal tracking component and a signal regeneration component. The RF converter down converts the antenna RF signals to intermediate frequency (IF) signals. After receiving the IF signals, the anti-jamming processing component generates a group of beam signals. Based on the group of beam signals, the signal tracking component tracks satellite signals to form a group of corresponding digital satellite signals. Coupled to the signal tracking component, the signal regeneration component converts the group of digital satellite signals to a set of composite RF signals to be fed to the legacy GPS receiver.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
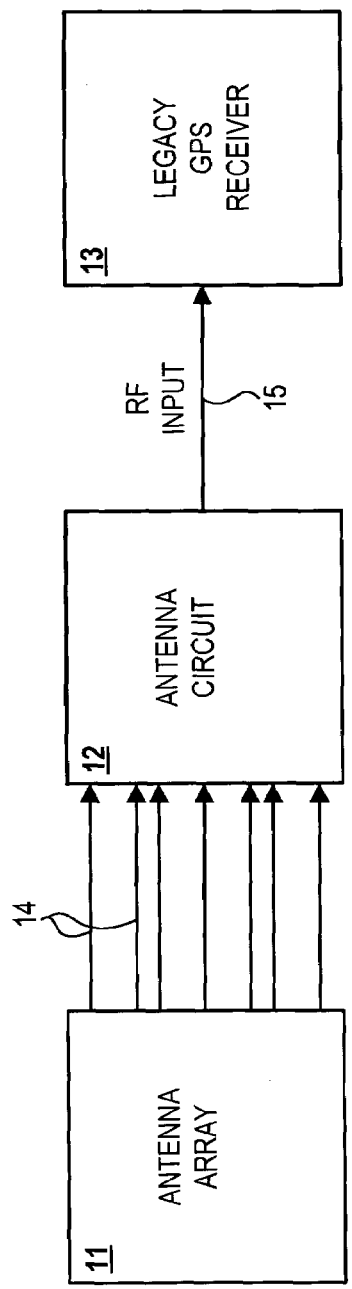
FIG. 1 is a block diagram of a first approach for mitigating Global Positioning System (GPS) jamming, according to the prior art.

Referring now to the drawings and in particular to FIG. 1, there is depicted a block diagram of a first approach for mitigating Global Positioning System (GPS) jamming, according to the prior art. As shown, an antenna circuit 12 is coupled between an antenna array 11 and a legacy GPS receiver 13. Radio Frequency (RF) signals 14 are initially received by antenna array 11. RF signals 14 are then processed by antenna circuit 12 in order to reduce the levels of interference and to improve the ability of legacy GPS receiver 13 to track GPS radio signals. A single RF signal 15 (with interference reduced) is subsequently sent to legacy GPS receiver 13. The key limitation of the first approach 11 is that all GPS satellites are tracked from the same composite pattern data. Thus, there is no way to optimize the protection for each GPS satellite being tracked.

Figure 2:
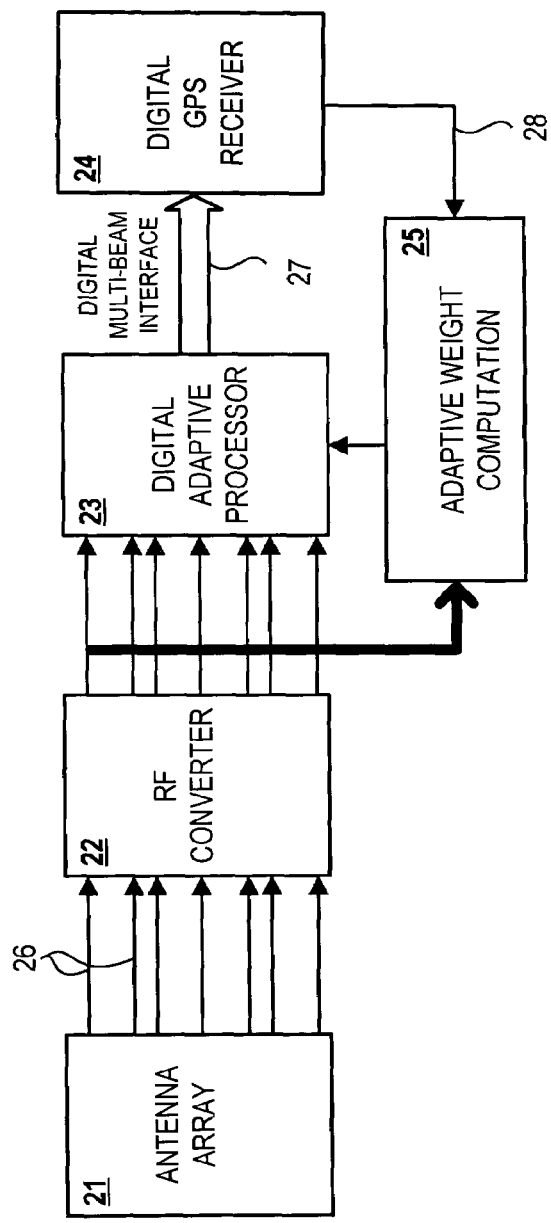
FIG. 2 is a block diagram of a second approach for mitigating GPS jamming, according to the prior art.

With reference now to FIG. 2, there is depicted a block diagram of a second approach for mitigating GPS jamming, according to the prior art. The second approach is to use digital technology to provide digital multi-beam steering. As shown, an RF converter 22 and a digital adaptive processor 23 are coupled between an antenna array 21 and a digital GPS receiver 24. RF signals 26 are initially received by antenna array 21. RF signals 26 are then sent to RF converter 22. The output signals from RF converter 22 are passed to digital adaptive processor 23. Digital adaptive processor 23, in turn, sends a digital multi-beam interface signal 27 to digital GPS receiver 24. Digital GPS receiver 24 also transmits a feedback signal 28 to an adaptive weight computation module 25 that is coupled to digital adaptive processor 23.

Although the above-mentioned second approach allows anti-jamming processing to be customized for each GPS satellite being tracked, the key limitation of the second approach is that the GPS receiver must be capable of processing digital beam data. Thus, in order to apply the second approach to a legacy navigation system, the legacy GPS receiver must be removed and be replaced with a digital GPS receiver, which will result in costly hardware, software and system level re-qualification. Such costs often make the above-described digital upgrade unaffordable.

Figure 3:
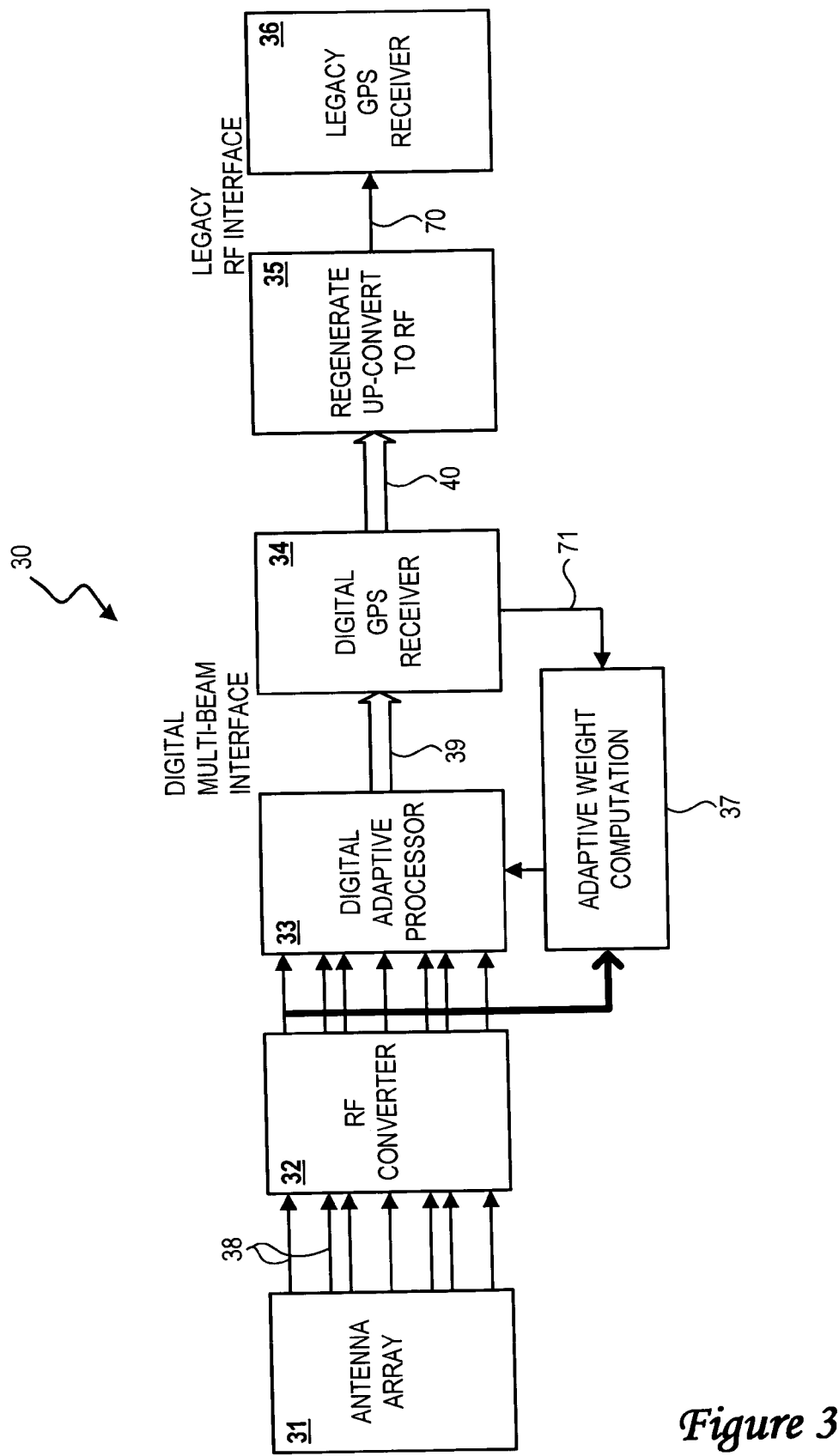
FIG. 3 is a block diagram of an apparatus for providing anti-jamming capability to a legacy GPS receiver, in accordance with a preferred embodiment of the present invention.

Referring now to FIG. 3, there is depicted a block diagram of an apparatus for providing anti-jamming capability to a legacy GPS receiver, in accordance with a preferred embodiment of the present invention. As shown, an apparatus 30 includes an antenna array 31, an RF converter 32, a digital adaptive processor 33, a digital GPS receiver 34 and a regenerate up-convert to RF module 35. RF converter 32 and digital adaptive processor 33 are coupled between antenna array 31 and digital GPS receiver 34. Regenerate up-convert to RF module 35 is coupled between digital GPS receiver 34 and legacy GPS receiver 36. Apparatus 30 also includes an adaptive weight computation 37 coupled to digital adaptive processor 33.

After receiving RF signals, antenna array 31 passes RF signals 38 to RF converter 32. RF converter 32 down converts the antenna RF signals to intermediate frequency (IF) signals. The IF signals from RF converter 32 are passed to digital adaptive processor 33. Digital adaptive processor 33, in turn, outputs a group of beam signals 39 (which includes digital adaptive data) to digital GPS receiver 34. As digital GPS receiver 34 tracks satellite signals based on the optimal multi-beam input data from beam signals 39, digital GPS receiver 34 outputs a group of digital signals 40. Digital signals 40 include information from tracking loops within digital GPS receiver 34 that can be used to regenerate the received satellite signals. Digital signals 40, with the full benefit multi-beam anti-jamming protection, are then converted by regenerate up-convert to RF module 35 to a group of composite RF signals 70. Composite RF signals 50 are subsequently sent to legacy GPS receiver 36. Digital GPS receiver 34 also sends a feedback signal 71 to adaptive weight computation module 37 that is coupled to digital adaptive processor 33.

The above-mentioned components of apparatus 30 can be generally divided into three major categories: i. anti-jamming processing component, ii. signal tracking component, and iii. signal regeneration component.

Figure 4:
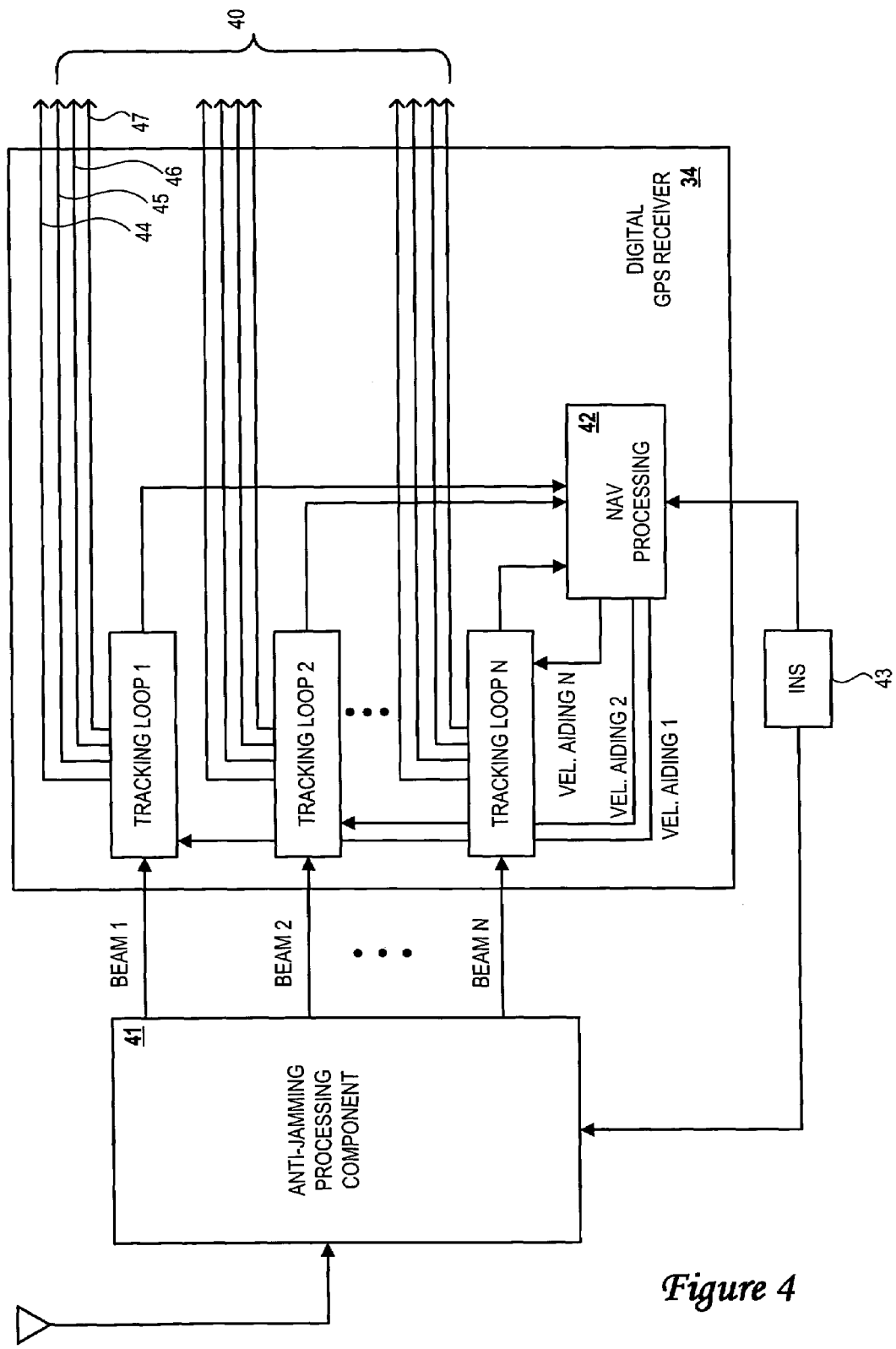
FIG. 4 is a detailed block diagram of an anti-jamming processing component and a signal tracking component of the apparatus from FIG. 3, in accordance with a preferred embodiment of the present invention.

With reference now to FIG. 4, there is illustrated a detailed block diagram of the anti-jamming processing component and the signal tracking component of apparatus 30, in accordance with a preferred embodiment of the present invention. The anti-jamming processing component of apparatus 30 is formed by RF converter 32, digital adaptive processor 33 and adaptive weight computation module 37 from FIG. 3. The signal tracking component is formed by digital GPS receiver 34 from FIG. 3. As shown in FIG. 4, an anti-jamming processing component 41 is coupled to digital GPS receiver 34 having tracking loops 1 through N and a navigation processing module 42. Tracking loops 1 through N and navigation processing module 42, along with an inertial navigation system 43, operate as a complete functional unit and can be integrated into a host platform as the sole or primary GPS system.

Anti-jamming processing component 41 sends beam signals via beams 1–N to respective tracking loops 1–N within digital GPS receiver 34. In turn, each of tracking loops 1–N produces a subset of digital signals 40 to be sent to regenerate up-convert to RF module 35 from FIG. 3. Each subset of digital signals 40 includes code phase, code rate, the carrier rate, and the navigation message. For example, for P(Y) tracking on L1, tracking loop 1 generates the P(Y) code phase in an output 44, the P(Y) code rate in an output 45, the L1 carrier rate in an output 46, and the navigation message in an output 47, all corresponding to one satellite.

Figure 5:
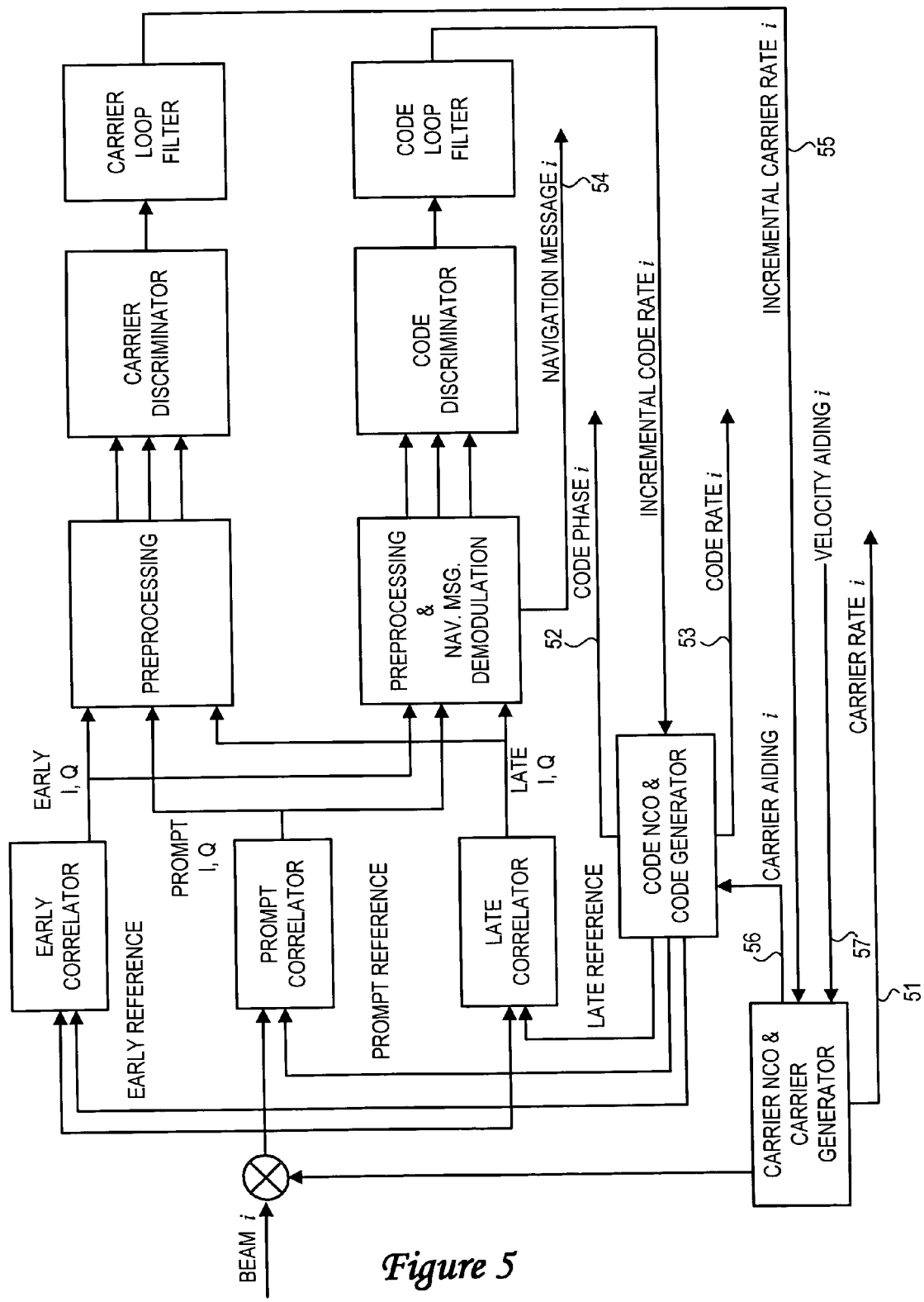
FIG. 5 is a detailed block diagram of a tracking loop within the signal tracking component from FIG. 4, in accordance with a preferred embodiment of the present invention.

Since tracking loops 1–N are substantially identical to each other, only tracking loop 1 is further described in details. Referring now to FIG. 5, there is depicted a detailed block diagram of tracking loop 1, in accordance with a preferred embodiment of the present invention. After receiving a beam i from anti-jamming processing component 41 from FIG. 4, tracking loop 1 generates four signals, namely, a carrier rate signal 51, a code phase signal 52, a code rate signal 53 and a navigation message 54. Carrier rate signal 51 is the sum of a velocity aiding signal 57 and its adjustments, or an incremental carrier rate signal 55, detected by a carrier tracking loop. Code rate signal 53 is the sum of carrier aiding signal 56 and its adjustments, or incremental code rate signal 55, detected by a code tracking loop. Navigation message 54 is also detected by the code tracking loop.

Normally, the RF input to a GPS receiver simultaneously contains the signals from a number of satellites. Each of the satellites constructs its own code sequences and navigation messages. The code sequences and navigation messages are transmitted on a set of fixed frequencies common to all the satellites. However, a GPS receiver receives the signal from each satellite at a somewhat different frequency due to the Doppler effect caused by the relative motion between the satellite and antenna. The signal regeneration component of apparatus 30 reconstructs the original GPS signal with the additional characteristic of including the Doppler effect on the signal frequencies. Specifically, the signal regeneration component of apparatus 30 reconstructs the code and navigation code produced by the satellites, and places them on carriers offset from the nominal transmitted frequencies by the observed Doppler shifts.

Figure 6:
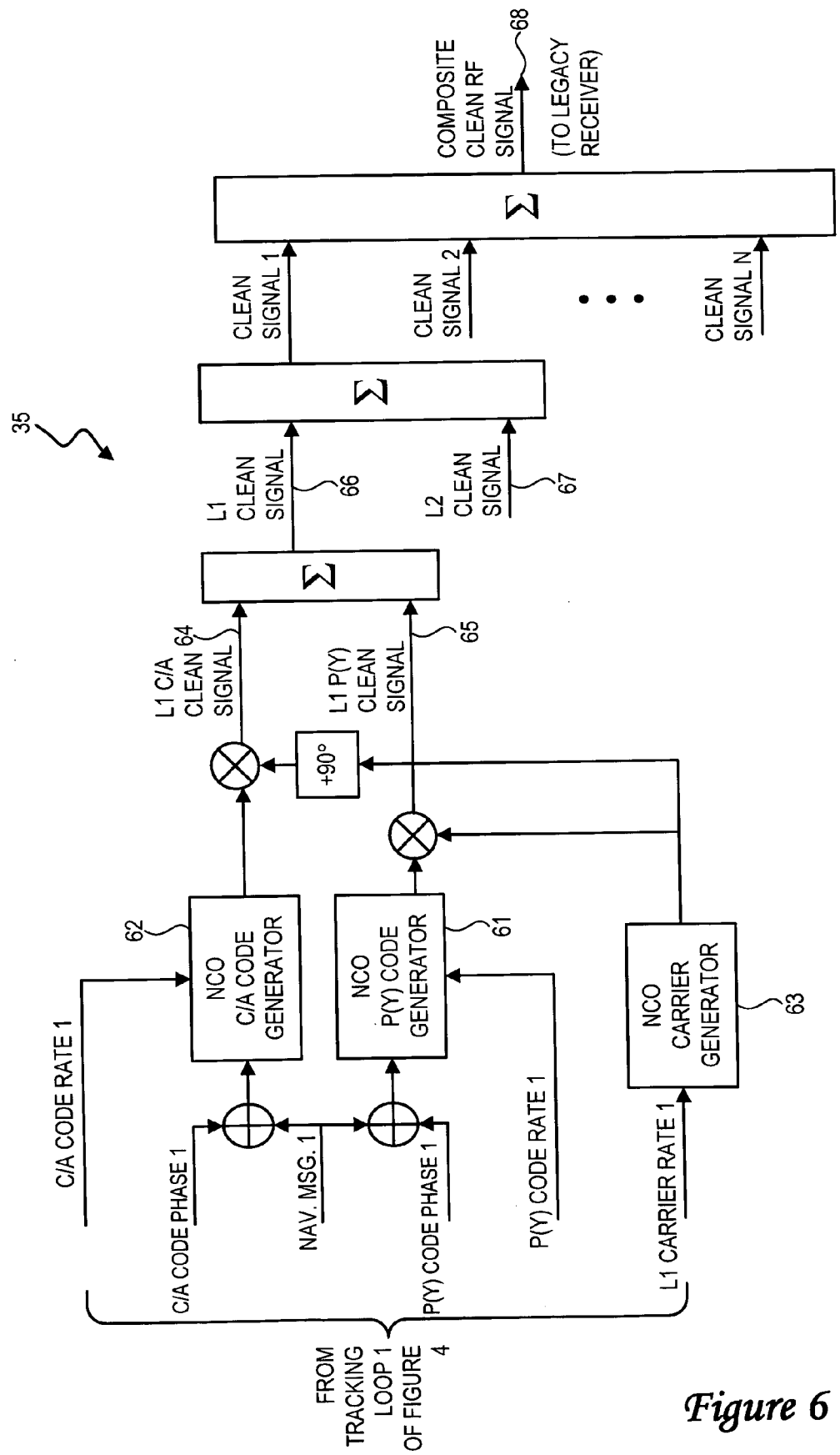
FIG. 6 is a detailed block diagram of a signal regeneration component within the apparatus from FIG. 3, in accordance with a preferred embodiment of the present invention.

With reference now to FIG. 6, there is depicted a detailed block diagram of the signal regeneration component of apparatus 30, in accordance with a preferred embodiment of the present invention. Signal regeneration component of apparatus 30 is formed by regenerate up-convert to RF module 35 from FIG. 3. As shown, inputs to regenerate up-convert to RF module 35 include the C/A code rate signals and the P(Y) code rate, C/A code and P(Y) code, the carrier rate and the navigation message from tracking loop 1 of FIG. 4. The C/A codes and P codes are known predetermined sequences that are generated locally. A Selective Availability Anti-Spoofing Module (SAASM) unit or future security device must be used to convert P codes to corresponding Y codes. As shown, C/A and P(Y) codes are produced at the L1 frequency, and P(Y) codes are produced at the L2 frequency. Any other combination of code and frequency are possible by including or excluding the appropriate components from the signal regeneration component.

Inputs to regenerate up-convert to RF module 35 are L1 components of signals corresponding to, for example, a satellite 1. An input P(Y) code 1 is a bit sequence corresponding to the P(Y) code for satellite 1, while an input nav. msg. 1 is a bit sequence corresponding to the navigation message send on L1 by satellite 1. The bit streams are combined (at the proper rates) by an XOR function and the result is fed to the P(Y) code generator 61. Similarly, the input C/A code 1 is a bit sequence corresponding to the C/A code for satellite 1, and is combined (at the proper rate) by an XOR function with nav message 1. The result is fed to a C/A code generator 62.

Due to the relative motion between satellite 1 and an antenna, the code and carrier rates are offset from their nominal values. Hence, C/A code rate 1 is an observed rate for the C/A code component of the L1 signal and is fed to the numerically controlled oscillator (NCO) generating the C/A code. An input P(Y) code rate 1 is an observed rate for the P(Y) code component of the L1 signal and is fed to NCO P(Y) code generator 61. An input L1 carrier rate 1 is an observed L1 carrier rate and is fed to NCO carrier generator 63.

NCO carrier generator 63 produces an L1 carrier with its frequency controlled by the L1 carrier rate. C/A code generator 62 receives an input bit stream and outputs it at the rate governed by C/A code rate 1. Similarly, P(Y) code generator 61 receives an input bit stream and outputs it at the rate governed by P(Y) code rate 1. The resulting P(Y) code modulates the L1 carrier to produce an L1 P(Y) Clean Signal 65. In a similar manner, the C/A code is used to produce an L1 C/A Clean Signal 64. However, since the C/A code is transmitted in quadrature with the P(Y) code, the L1 carrier phase is advanced by 90 degrees before being modulated by the C/A code.

Next, L1 C/A clean signal 64 and L1 P(Y) clean signal 65 are added together to form an L1 clean signal 66. Similarly, an L2 P(Y) clean signal 67 is produced corresponding to the L2 carrier. In the case of the L2 carrier, the P(Y) code is the sole component of L2 clean signal. L1 and L2 clean signals 66–67 are added together to form a Clean Signal 1, a replica of the observed satellite 1 signal without the presence of an interference or jamming signal. Likewise, a clean signal replica is generated for each observed satellite, producing Clean Signal 1, . . . , Clean Signal N. Finally, Clean Signals 1–N are summed to form a composite clean RF signal 68 that is sent to a legacy receiver, such as legacy receiver 36 from FIG. 3.

As has been described, the present invention provides an apparatus for providing anti-jamming capability to legacy GPS receivers. The present invention addresses the limitations in the two prior art approaches, enabling a multi-beam steering solution without the need to replace existing legacy GPS receivers.

The present invention is applicable, with the obvious changes, to other GPS signal structures, such as the currently proposed addition of M-code and the additional civilian frequency L5. The present invention is also applicable to other radio navigation systems such as Russia's GLONASS and Europe's Galileo, currently in development.

The key advantage of the present invention is the ability to provide state-of-the-art anti-jamming GPS performance for systems that have existing GPS receivers without the need for software or cabling changes on the using platform. Without the present invention, platforms must either do without enhanced anti-jamming or wait until there is sufficient funding to purchase both the sophisticated anti-jamming equipment and pay for all necessary platform modifications in hardware, software, and re-qualifications.

While the invention has been particularly shown and described with reference to a preferred embodiment, it will be understood by those skilled in the art that various changes in form and detail may be made therein without departing from the spirit and scope of the invention.

What is claimed is:

1. An apparatus for providing anti-jamming capability to a legacy GPS receiver, said apparatus comprising:
   a radio frequency (RF) converter for converting antenna signals to RF signals;
   an anti-jamming processing component, coupled to said RF converter, for generating a group of beam signals from said RF signals;
   a signal tracking component, coupled to said anti-jamming processing component, for tracking satellite signals based on said group of beam signals to form a group of digital satellite signals; and
   a signal regeneration component, coupled to said signal tracking component, for converting said group of digital satellite signals to a set of composite RF signals to be fed to said legacy GPS receiver.

2. The apparatus of claim 1, wherein said anti-jamming processing component is a digital adaptive processor.

3. The apparatus of claim 2, wherein said apparatus further includes an adaptive weight computation coupled to said digital adaptive processor.

4. The apparatus of claim 1, wherein said signal tracking component is a digital GPS processor.

5. The apparatus of claim 1, wherein said signal regeneration component is a regenerate up-convert to RF module.

6. A method for providing anti-jamming capability to a legacy GPS receiver, said method comprising:
   converting antenna signals to RF signals;
   generating a group of beam signals from said RF signals;
   tracking satellite signals based on said group of beam signals to form a group of digital satellite signals; and
   converting said group of digital satellite signals to a set of composite RF signals to be fed to said legacy GPS receiver.

* * * * *